United States Patent Office 3,538,644
Patented Nov. 10, 1970

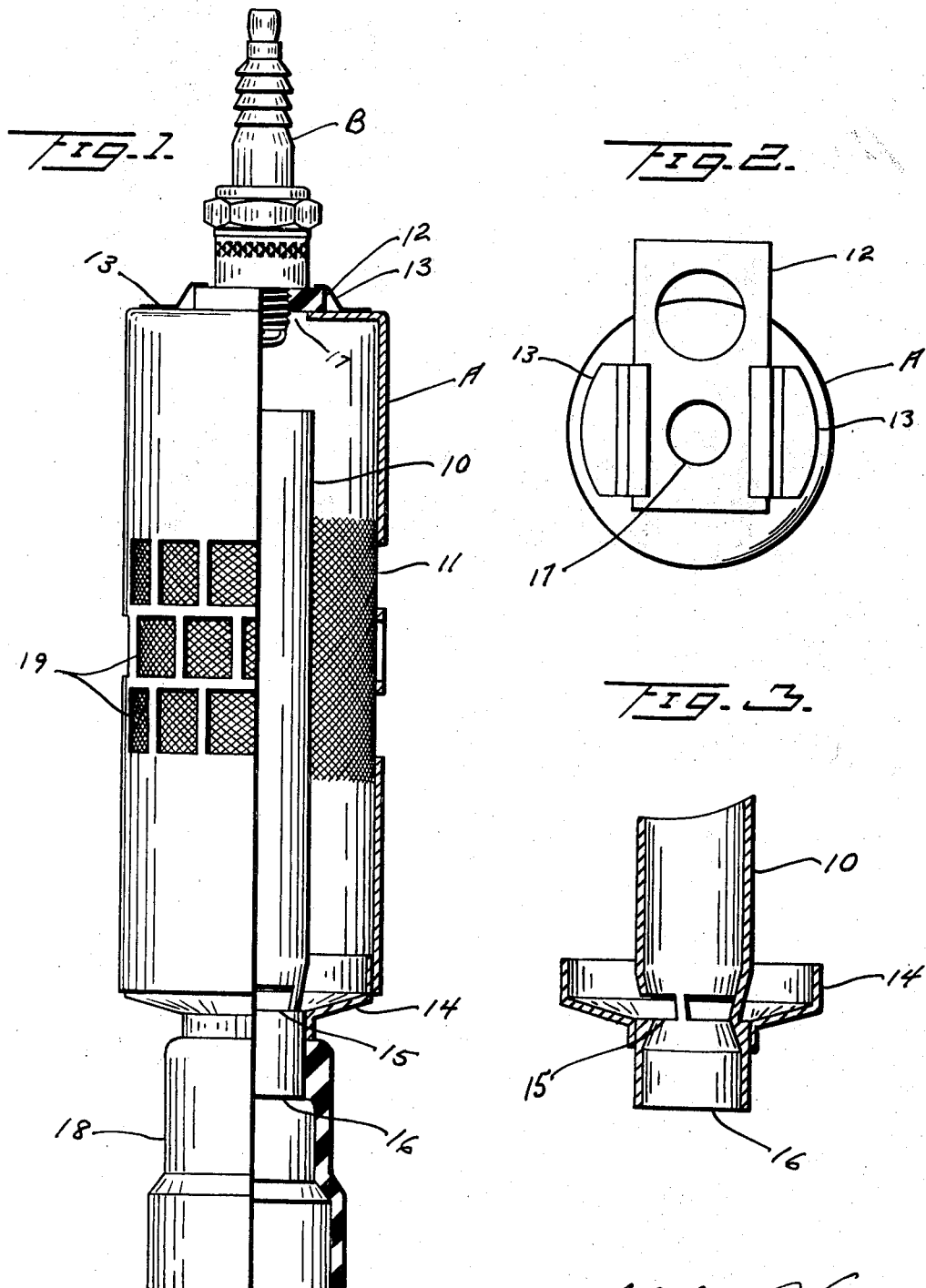

3,538,644
PORTABLE SPARK PLUG CLEANER
Sheldon J. Morris, 9930 Edmore Place,
Sun Valley, Calif. 91352
Filed Apr. 15, 1968, Ser. No. 721,423
Int. Cl. B24c *3/06, 3/34*
U.S. Cl. 51—8      1 Claim

ABSTRACT OF THE DISCLOSURE

A portable spark plug cleaner in which a venturi converts a low pressure air stream into a blast to carry abrasive particles against a spark plug which is held in a cylindrical housing having an air filter and an exhaust.

---

The present invention relates to a cleaning device in the form of a housing and related components specifically adapted for cleaning spark plugs.

The object of the present invention is to provide a means of impelling an abrasive, and retaining same, into a spark plug for the purpose of cleaning same by means of low air pressure, primarily from vacuum cleaner exhaust; however, any other feasible source of air or gas can be used. Another object of the present invention is the provision of a spark plug cleaner which is simple in construction, compact, thoroughly reliable and efficient, simple to operate, and not relying on high air pressure sources for operation.

These, together with other objects and advantages which will become apparent, reside in the details of preferred construction and operation as more fully hereinafter described, claimed, and illustrated in the accompanying drawings forming a part hereof, wherein like numerals refer to like parts throughout, and in which:

FIG. 1 is an elevation, partly in section.

FIG. 2 is a top view showing spark plug receptacle, which is removable.

FIG. 3 is a sectional view showing venturi and accumulator.

Referring to the drawing in detail, the letter A designates the spark plug cleaner of the present invention, which is symmetrical in construction. The letter B shows a spark plug in place for cleaning.

The construction of the spark plug cleaner A includes a venturi tube 10, mesh screen 11, a receptacle 12, two receptacle clips 13, an accumulator 14, and an adapter 18.

The cylinder A has multiple openings 19 around its entire circumference in one section, with an air inlet 16 at its lower end, and an opening 17 to accommodate a spark plug in its top end.

11, a mesh of suitable weave to retain an abrasive and allow exhaust air to escape, is affixed around the entire inner circumference of A covering the openings 19.

14 is an accumulator in shape of a cone located at the lower end of A.

10 is a venturi tube affixed centrally within the accumulator 14 and housing A, and is comprised of several slotted openings 15 around the section just above the narrowest portion of the venturi, the lower edge of these slots being located at the precise bottom edge of the accumulator 14. See FIG. 3 for detail view.

12 is a receptacle made of resilient material to form a seal over the upper opening 17 and is held down and in place by two clips 13. The receptacle 12 may be moved back and forth to accommodate different sizes of spark plugs, which are screwed into and held in place by the receptacle 12 during cleaning.

18 is an adapter for connecting air supply to the spark plug cleaner.

In the function of A an abrasive is poured into A prior to attaching the source of air into the adapter. Air flowing through the venturi is increased in velocity, pulling the abrasive through the lower slotted openings 15 of the venturi tube into the air stream and carrying same upward with increased velocity against the spark plug, 13. Air and abrasive circulate down the inner walls of A, the air passing out through mesh 11, the abrasive returning to accumulator 14 and reentering slotted openings 15 in venturi tube to repeat its cycle.

What is claimed is:

1. A spark plug cleaner comprising a housing in the form of a cylinder fitted with an air filter and exhaust and having a top provided with a removable resilient receptacle to receive a spark plug, a cone shaped accumulator attached to the bottom of the cylinder, and a low pressure air tube fixed centrally within the cylinder and fitted with a slotted venturi located at the precise bottom edge of the cone shaped accumulator, the venturi converting a low air pressure stream into a blast sufficient to carry a granular cleaning agent up the tube into a spark plug positioned directly above the air tube in the resilient receptacle which holds the spark plug in place and acts as a sealant during cleaning.

References Cited

UNITED STATES PATENTS

| | | | |
|---|---|---|---|
| 1,292,004 | 1/1919 | Miller | 51—8 |
| 1,399,225 | 12/1921 | Pellet | 51—8 |
| 1,864,072 | 6/1932 | Kleinfeld | 51—8 |
| 2,277,911 | 3/1942 | Johnson | 51—8 |
| 2,458,825 | 1/1949 | Battey | 51—8 |
| 3,435,561 | 4/1969 | Mori | 51—8 |

FOREIGN PATENTS 541,312    11/1941    Great Britain.

LESTER M. SWINGLE, Primary Examiner